(12) United States Patent
Vignerol et al.

(10) Patent No.: US 11,555,556 B2
(45) Date of Patent: Jan. 17, 2023

(54) VALVE AND RESERVOIR(S) FOR PRESSURIZED FLUID

(71) Applicant: L'Air Liquide, Société Anonyme pour l'Etude et l'Exploitation des Procédés Georges Claude, Paris (FR)

(72) Inventors: Samuel Vignerol, Fontenay le Fleury (FR); Antoine Frenal, Ezanville (FR); Denis Muller, Rueil Malmaison (FR); Hervé Paoli, Rueil Malmaison (FR); Morgan Lamiable, Metzer Visse (FR); Johan Broechler, Villerupt (FR); Claudio Di Filippo, Noisseville (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 302 days.

(21) Appl. No.: 16/652,903

(22) PCT Filed: Aug. 2, 2018

(86) PCT No.: PCT/FR2018/052000
§ 371 (c)(1),
(2) Date: Apr. 1, 2020

(87) PCT Pub. No.: WO2019/068972
PCT Pub. Date: Apr. 11, 2019

(65) Prior Publication Data
US 2020/0240545 A1 Jul. 30, 2020

(30) Foreign Application Priority Data

Oct. 5, 2017 (FR) ........................................ 1701024
Oct. 5, 2017 (FR) ........................................ 1701025

(51) Int. Cl.
*F16K 31/524* (2006.01)
*F15B 20/00* (2006.01)
(Continued)

(52) U.S. Cl.
CPC ........ *F16K 31/52408* (2013.01); *F15B 20/00* (2013.01); *F16K 1/302* (2013.01);
(Continued)

(58) Field of Classification Search
CPC ........ F16K 1/443; F16K 35/025; F16K 35/14; F16K 31/52408; F17C 13/04
See application file for complete search history.

(56) References Cited

U.S. PATENT DOCUMENTS 1,160,285 A * 11/1915 Hobbs et al. ........... F16K 1/306
137/614.19
1,944,456 A 1/1934 Pearson
(Continued)

FOREIGN PATENT DOCUMENTS

EP    3 062 005    8/2016
FR    2 790 299    9/2000
(Continued)

OTHER PUBLICATIONS

International Search Report and Written Opinion for corresponding PCT/FR2018/052000, dated Dec. 19, 2018.
(Continued)

*Primary Examiner* — Reinaldo Sanchez-Medina
*Assistant Examiner* — Nicole Gardner
(74) *Attorney, Agent, or Firm* — Elwood L. Haynes

(57) ABSTRACT

A valve for pressurized fluid having a body housing a fluid circuit having an upstream end configured to be placed in communication with a reserve of pressurized fluid and a downstream end configured to be placed in communication with a user of fluid, the circuit including a collection of valve
(Continued)

shutter(s) comprising at least one shutoff valve shutter allowing the circuit to be closed or opened, the valve including a mechanism for manually controlling the collection of valve shutter(s), the control mechanism being mounted with the ability to move on the body between a rest position in which the collection of valve shutter(s) is in a position in which the circuit is closed and an active position in which the control mechanism actuates the collection of valve shutter(s) into a position in which the circuit is open to a first bore section.

4 Claims, 4 Drawing Sheets

(51) Int. Cl.
| | |
|---|---|
| *F16K 31/60* | (2006.01) |
| *F16K 1/44* | (2006.01) |
| *F16K 35/02* | (2006.01) |
| *F16K 35/14* | (2006.01) |
| *F17C 13/04* | (2006.01) |
| *F16K 1/30* | (2006.01) |
| *F17C 1/00* | (2006.01) |
| *F15B 15/26* | (2006.01) |

(52) U.S. Cl.
CPC .............. *F16K 1/303* (2013.01); *F16K 1/304* (2013.01); *F16K 1/443* (2013.01); *F16K 31/602* (2013.01); *F16K 35/025* (2013.01); *F16K 35/14* (2013.01); *F17C 1/00* (2013.01); *F17C 13/04* (2013.01); *F15B 2015/267* (2013.01); *F17C 2201/0109* (2013.01); *F17C 2201/032* (2013.01); *F17C 2201/058* (2013.01); *F17C 2203/0617* (2013.01); *F17C 2205/035* (2013.01); *F17C 2205/0326* (2013.01); *F17C 2205/0329* (2013.01); *F17C 2205/0385* (2013.01); *F17C 2205/0394* (2013.01); *F17C 2221/011* (2013.01); *F17C 2223/0123* (2013.01); *F17C 2223/036* (2013.01); *F17C 2223/043* (2013.01); *F17C 2227/044* (2013.01); *F17C 2250/043* (2013.01); *F17C 2260/021* (2013.01); *F17C 2260/044* (2013.01); *F17C 2260/056* (2013.01)

(56) References Cited

U.S. PATENT DOCUMENTS

| | | | |
|---|---|---|---|
| 2,709,452 | A | 4/1951 | Calabrese |
| 2,830,784 | A * | 4/1958 | Placette .............. F16K 31/363 |
| | | | 251/332 |
| 3,737,140 | A | 6/1973 | Toth |
| 5,836,352 | A | 11/1998 | Nimberger |
| 6,035,463 | A | 3/2000 | Pawelzik et al. |
| 9,500,296 | B2 * | 11/2016 | Wadham ................ F16K 35/00 |
| 9,581,250 | B2 * | 2/2017 | Wales ..................... F16K 1/304 |
| 10,344,918 | B2 * | 7/2019 | Frenal .................... F16K 1/307 |
| 2004/0231729 | A1 | 11/2004 | Lang et al. |
| 2005/0173007 | A1 | 8/2005 | Cannet et al. |
| 2006/0175569 | A1 | 8/2006 | Henson |
| 2014/0048169 | A1 | 2/2014 | Pisot et al. |
| 2016/0153617 | A1 | 6/2016 | Mellors |

FOREIGN PATENT DOCUMENTS

| | | |
|---|---|---|
| FR | 2 793 297 | 11/2000 |
| FR | 2 828 922 | 2/2003 |
| FR | 2 840 664 | 12/2003 |
| FR | 2 974 402 | 10/2012 |
| GB | 441 279 | 7/1924 |
| GB | 834 759 | 8/1958 |
| WO | WO 2016 146743 | 3/2016 |

OTHER PUBLICATIONS

International Search Report and Written Opinion for related PCT/FR2018/052001, dated Nov. 20, 2018.
International Search Report and Written Opinion for related PCT/FR2018/052005, dated Nov. 20, 2018.
International Search Report and Written Opinion for related PCT/FR2018/052002, dated Nov. 23, 2018.
International Search Report and Written Opinion for related PCT/FR2018/052003, dated Nov. 23, 2018.
International Search Report and Written Opinion for related PCT/FR2018/051994, dated Dec. 19, 2018.
International Search Report and Written Opinion for related PCT/FR2018/051995, dated Dec. 19, 2018.

* cited by examiner

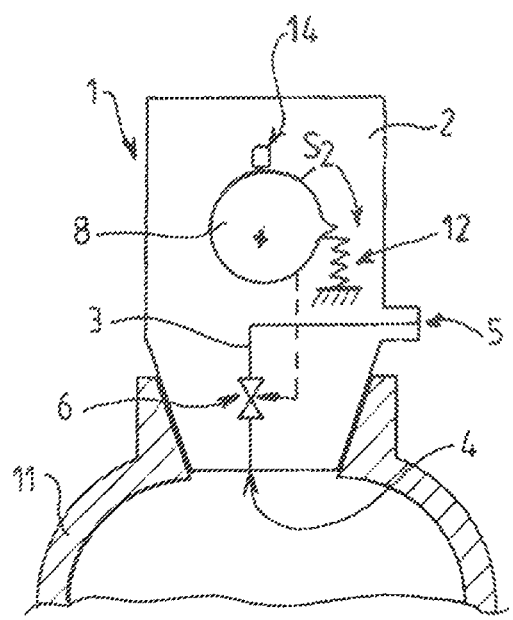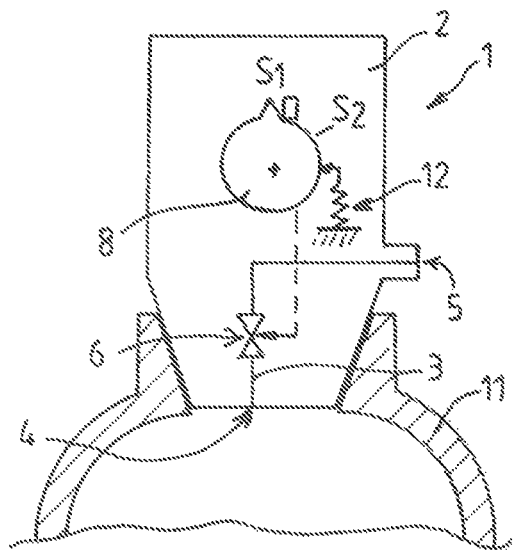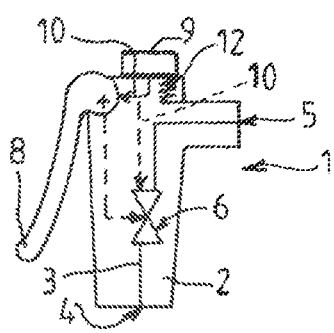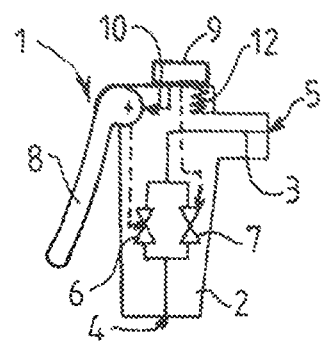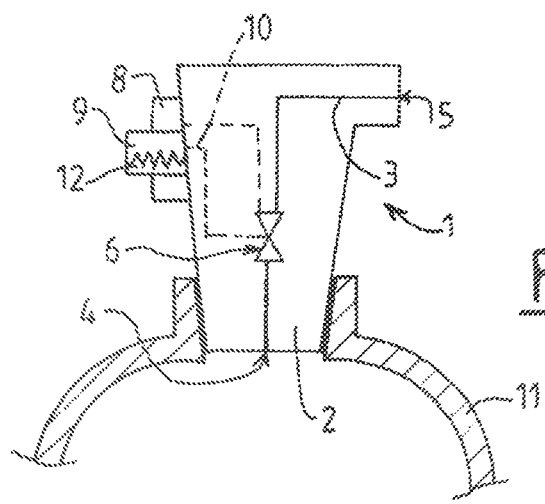

ValVE AND RESERVOIR(S) FOR
PRESSURIZED FLUID

CROSS REFERENCE TO RELATED
APPLICATIONS

This application is a 371 of International Application PCT/FR2018/052000, filed Aug. 2, 2018, which claims priority to French Patent Application Nos. 1701024 and 1701025, both filed Oct. 5, 2017, the entire contents of which are incorporated herein by reference.

BACKGROUND

The invention relates to a valve and to a reservoir or collection of reservoirs for pressurized fluid.

The invention relates more particularly to a valve for pressurized fluid comprising a body housing a fluid circuit having an upstream end intended to be placed in communication with a reserve of pressurized fluid and a downstream end intended to be placed in communication with a user of fluid, the circuit comprising a collection of valve shutter(s) comprising at least one shutoff valve shutter allowing the circuit to be closed or opened, the valve comprising a mechanism for manually controlling the collection of valve shutter(s), the control mechanism being mounted with the ability to move on the body between a rest position in which the collection of valve shutter(s) is in a position in which the circuit is closed and an active position in which the control mechanism actuates the collection of valve shutter(s) into a position in which the circuit is open to a first bore section, the control mechanism comprising an intermediate open position in which it actuates the collection of valve shutter(s) into a predetermined intermediate position in which the circuit is open to a determined second bore section smaller than the first bore section.

Good practice in the use of pressurized gas cylinders fitted with a valve recommends that the outlet connector of the valve be swept with gas from the cylinder before any equipment is connected to it. This brief sweep is generally performed by briefly opening the isolation valve shutter of the valve by manipulating the manual control member (handwheel, lever or the like).

This purge also allows the user easily and in a controlled way to perform cycles of rinsing the equipment downstream of the valve. Usually, the rinsing cycles are cycles of pressurizing (5 to 10 bar) and purging (1-2 bar gauge) in order to remove the impurities (N2/O2/H2O/etc.) from the air.

However, this practice is not possible or is dangerous in the case of valves of which the manual control member causes opening to be too sudden (lever notably, and in the case of high-pressure), see for example FR2793297A1.

If the cylinder is not attached or firmly held it may topple and fall. In addition, the noise of the high-pressure gas released (very high frequency) may cause hearing damage.

This sudden opening of the circuit may also cause damage to the equipment (regulators) connected downstream. In instances in which the gas is a fuel oxidizer (oxygen), adiabatic compression (sharp increase in temperature) may arise and cause the non-metallic elements of the regulator (seal, seat made of plastic) to ignite.

One known solution consists in providing for gradual opening of the valve via a mechanism of two concentric valve shutters actuated sequentially by the lever, see EP3062005A1. This solution is ill-suited to purge operations. Furthermore, unwanted opening of the valve may be encouraged if the valve has ergonomics that allow this brief opening.

These solutions provide only an imperfect answer to these problems.

SUMMARY

One object of the present invention is to alleviate all or some of the above-mentioned drawbacks of the prior art.

To this end, the valve according to the invention, in other respects in accordance with the generic definition given thereof in the above preamble, is essentially characterized in that the valve comprises a return member returning the control mechanism toward its rest position and a mechanical stop providing stable retention of the control mechanism in its active position, which is to say that, when the control mechanism is in its intermediate position in which the circuit is partially open and is not being held by hand, the return member moves the collection of valve shutter(s) into its rest position in which the circuit is closed and, when the collection of valve shutter(s) is in its active position and is not being held by hand, the mechanical stop maintains this active position against the force of the return member.

This structure allows the user easily, in complete safety and with ease to perform purge operations.

The valve offers the possibility of blowing out particles present in the outlet connector, without risk to the user because the flow rate during activation of the corresponding control member is limited. The risk of the cylinder toppling or being propelled and the noise are also reduced.

The rinsing (compression/expansion) cycles performed on the equipment downstream can be performed at low pressure. The ergonomics of use are suited to the operation via a controlled flow rate and a monostable actuation of the control mechanism for this operation.

Furthermore, embodiments of the invention may comprise one or more of the following features:

the ratio between the second bore section and the first bore section is comprised between $1/50$ and $1/2$ or between $1/100$ and $1/20$, and preferably between is $1/10$ and $1/5$ or between $1/80$ and $1/30$, the control mechanism comprises at least one of the following: a lever articulated to the body, a push-button to be moved in translation, a rotary actuator such as a handwheel or a knob, the control mechanism comprises a single manual control member actuating the collection of valve shutter(s) to open the circuit to the first bore section and to the second bore section, the control mechanism comprises two distinct manual control members actuating the collection of valve shutter(s) to open the circuit to the first bore section and to the second bore section.

a first manual control member is configured to actuate the collection of valve shutter(s) only into the intermediate position in which the circuit is open to the second bore section, the second manual control member being configured to actuate the collection of valve shutter(s) only into the position in which the circuit is open to the first bore section, the valve comprises a locking mechanism locking the second manual control member in the rest position preventing a movement toward the active position in which the circuit is open to the first bore section, the locking mechanism being controlled by the first manual control member, in its non-actuated rest position, the first manual control member locks the second manual control member in the rest position blocking the movement of the second manual control member in the active position in which the circuit is open to the first bore section, when the manual control member is in the actuated position (intermediate opening of the circuit to a second bore section), the manual control member unlocking the second manual control member allowing it to move from the position toward the active position and allowing the circuit to be opened to the first bore section.

the movement of the second manual control member from its rest position toward its active position describes a movement of a different nature or in a distinct direction, notably in an opposite direction, compared with the movement of the second manual control member moving from its rest position toward its actuated position, the valve comprises a coupling mechanism that couples the movement of the second manual control member and of the first manual control member when the second control member is moved from its active position toward its rest position, the coupling mechanism automatically urging the first manual control member toward its non-actuated position, the collection of valve shutter(s) comprises two distinct shut-off valve shutters able to move with respect to respective seats and in the open position respectively defining the two distinct bore sections, the two valve shutters are controlled respectively by the first manual control member and the second manual control member, the two distinct shut-off valve shutters are arranged in series in the one same line of the circuit, the two shutoff valve shutters are controlled by at least one same mobile pushrod controlled by the first manual control member and the second manual control member, actuation of the first manual control member moves the pushrod over a first travel that actuates the opening of a first of the two valve shutter(s) into an open position with the second bore section for the circuit, the subsequent movement of the second manual control member from its rest position toward its active position moving the pushrod over a second travel actuating the opening of the second valve shutter into a position in which the circuit is open with the first bore section, the locking mechanism that locks the second manual control member comprises a mobile mechanical end stop, the locking mechanism acts on a cam attached to the second manual control member.

actuation of the valve shutter or valve shutters is performed via a device that transmits force between the control mechanism and the collection of valve shutter(s), at least part of this force transmission device forms part of the locking mechanism.

the locking mechanism comprises a mechanical end stop between a profile of the cam and a mobile member of the mechanism transmitting movement between the cam and the collection of valve shutter(s), the two manual control members are levers articulated to the body and each comprising a respective cam having a respective cam profile and collaborating with at least one mobile pushrod for control of the collection of shutoff valve shutter(s), the coupling mechanism that couples the movement is incorporated into the cams of the levers, the coupling mechanism that couples the movement comprises a rod attached to at least one cam and at least one groove formed in the other cam and that accommodates and guides the rod, the configuration of the collection of valve shutters in the position in which the circuit is open to the second bore section is achieved when the second manual control member is in its rest position and at the same time the first manual control member is actuated, the two manual control members are adjacent or concentric or situated at a distance, notably on distinct or opposite faces of the body, the shutoff valve or valves comprise at least one of the following: a valve shutter capable of translational movement relative to a respective seat and urged toward the seat by a return member, a valve shutter incorporating a calibrated orifice allowing a predetermined flow rate to pass in the closed position corresponding to the first bore section of the circuit and allowing a second flow rate of gas in the open position corresponding to the first bore section of the circuit, a ball urged onto a seat by a return member, the locking mechanism may be of the mechanical and/or magnetic and/or pneumatic and/or electromechanical and/or hydraulic type, the locking mechanism is situated at least in part at one of the cams of the levers, the locking mechanism comprises a rod attached to at least one cam and at least one groove formed in the other cam and that accommodates the rod.

The invention also relates to a reservoir or collection of reservoirs for pressurized fluid, notably pressurized gas, comprising a valve according to any one of the features above or below.

The invention may also relate to any alternative device or method comprising any combination of the features above or below.

BRIEF DESCRIPTION OF THE DRAWINGS

For a further understanding of the nature and objects for the present invention, is reference should be made to the following detailed description, taken in conjunction with the accompanying drawings, in which like elements are given the same or analogous reference numbers and wherein;

FIG. 1 is a schematic and partial view in cross section illustrating the structure and operation of a first possible embodiment of the invention in a configuration of use, FIG. 2 is a schematic and partial view in cross section illustrating the structure and operation of a first possible embodiment of the invention in a configuration of use, FIG. 3 is a schematic and partial view in cross section illustrating the structure and operation of a second possible embodiment of the invention, FIG. 4 is a schematic and partial view in cross section illustrating the structure and operation of a third possible embodiment of the invention, FIG. 5 is a schematic and partial view in cross section illustrating the structure and operation of a fourth possible embodiment of the invention.

DETAILED DESCRIPTION OF PREFERRED EMBODIMENTS

Figure 6:
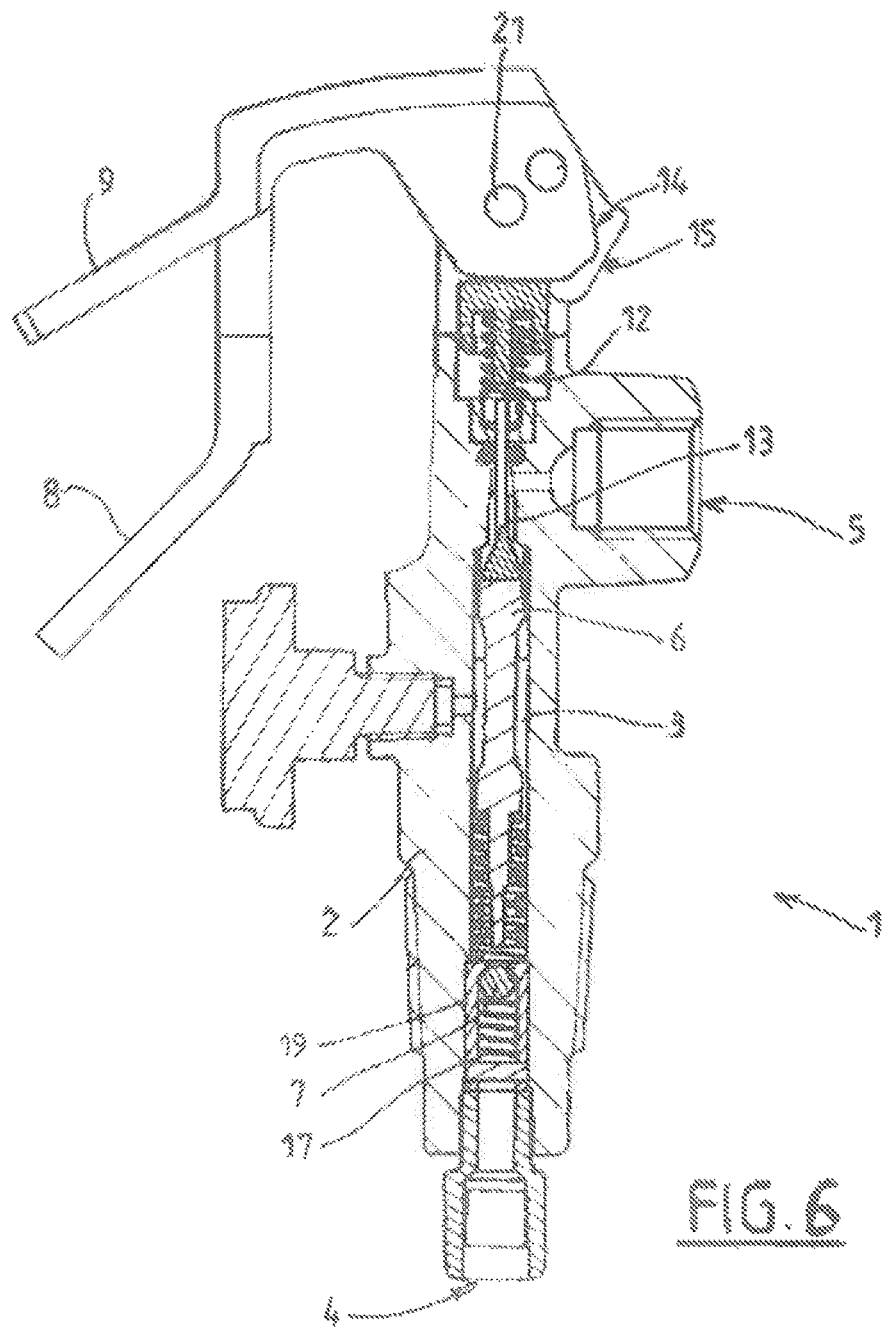
FIG. 6 is a schematic and partial view in cross section illustrating the structure and operation of a fifth possible embodiment of the invention.
Figure 7:
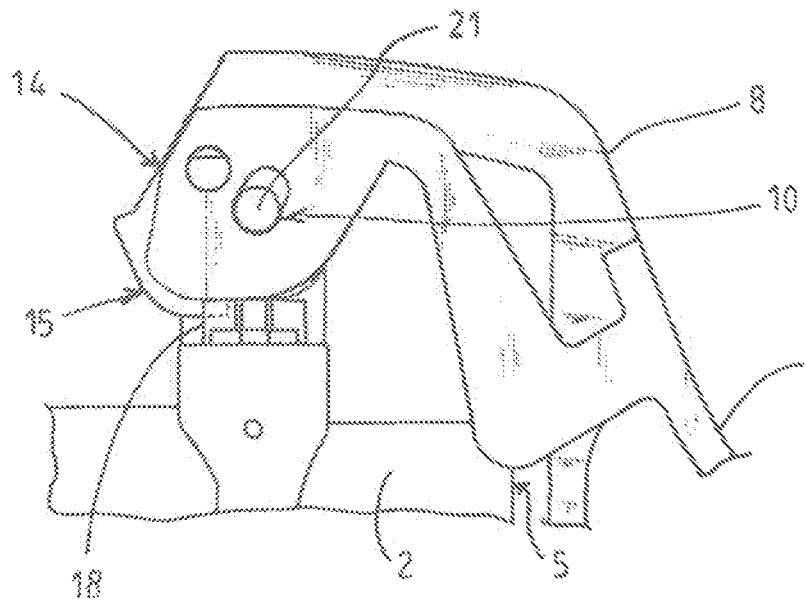
FIG. 7 is a schematic and partial side view illustrating a detail of the structure of a valve in a sixth possible embodiment of the invention, and in a first configuration of use.
Figure 8:
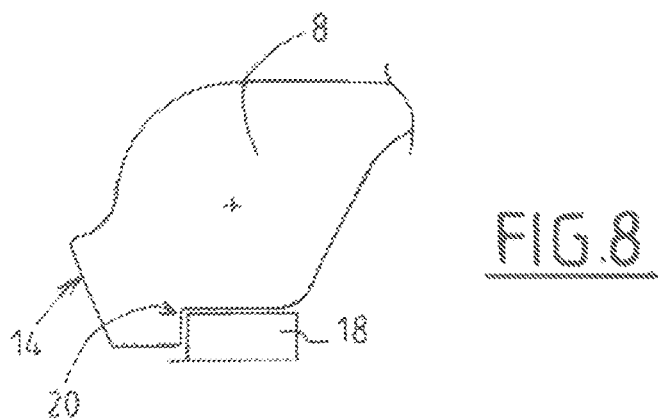
FIG. 8 depicts a detail of FIG. 7.
Figure 9:
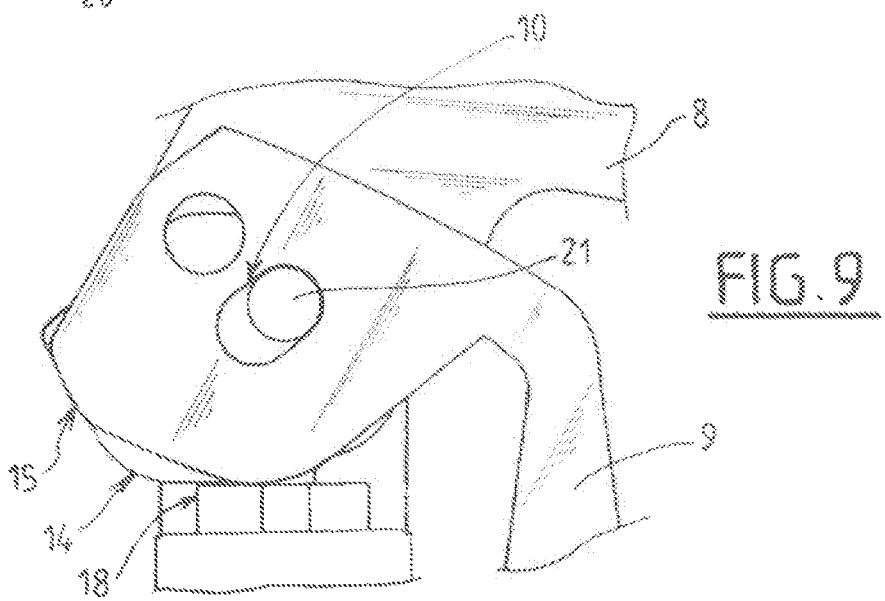
FIG. 9 depicts a view similar to that of FIG. 7, illustrating a detail of the structure of FIG. 7 in a second configuration of use.

The valve 1 illustrated in the figures comprises in the conventional way a body 2 housing a fluid circuit 3 having an upstream end 4 intended to be placed in communication with a reserve of pressurized fluid and a downstream end 5 intended to be placed in communication with a user of fluid.

The upstream end 4 may be connected to a pressurized gas cylinder 11 (see FIG. 5) or to circuitry connected to a pressurized-gas cylinder or several cylinders (rack of cylinders for example). For this purpose, the corresponding end of the body 2 of the valve 1 may be threaded.

The downstream end 5 opens for example onto an outlet connector for example.

The circuit 3 comprises a collection of valve shutter(s) comprising at least one shutoff valve shutter 6 allowing the circuit 3 to be closed or opened (isolation valve).

The valve 1 comprises a manual control mechanism 8 for manual control of the collection of valve shutter(s) 6. In this example, the manual control member 8 is a single handwheel mounted on the valve 1 with the ability to turn.

The manual control member 8 is able to move on the body 2 between a rest position in which the valve shutter 6 is in a position in which the circuit 3 is closed (see FIG. 1) and an active position in which the valve shutter 6 is in a position in which the circuit 3 is open to a first bore section S1, for example fully open (see FIG. 2).

The manual control member 8 passes via an intermediate position of opening in which it actuates the valve shutter 6 into an intermediate position in which the circuit 3 is open to a second bore section S2 smaller than the first bore section S1.

The valve 1 comprises a return member 12 (for example a spring) returning the manual control member 8 toward its rest position and a mechanical end stop 14 that holds the manual control member 8 stably in its active position.

What that means to say is that when the manual control member 8 is in its intermediate open position and not held by hand, the return member 12 moves the manual control member 8 into its rest position in which the circuit 3 is closed. By contrast, when the manual control member 8 is in its active position and not held by hand, the mechanical end stop 14 maintains this position against the force of the return member 12 (see FIG. 2). For example, a hard-point mechanism (end stop 14) provides this stable position.

What that means to say is that the release of a reduced flow rate (for purging or some other purpose) is achieved manually for as long as the user maintains the actuating force. By contrast, for withdrawal at the higher flow rate (full opening), the more advanced position is stable (the user can take a break from supplying force).

That provides the user with better ergonomics and safety.

The ratio (S2/S1) between the second bore section (S2) and the first bore section (S1) may be comprised between $\frac{1}{50}$ and $\frac{1}{2}$, and preferably between $\frac{1}{10}$ and $\frac{1}{5}$.

Of course, the manual control member 8 may be replaced by a lever articulated to the body 2.

The intermediate-open position is a predetermined position, for example offset by a determined angle (15 to 45°, notably 20 to 40° of rotation) and/or offset by a determined distance (for example 2.5 to 5 cm) with respect to the rest position.

The intermediate opening opens the circuit 3 between the upstream end 4 and downstream end 5 with a determined degree of opening (bore section S2 for example) which is preferably smaller than the degree of opening that is established in full opening (first section S1).

In the example of FIGS. 1 and 2, the control mechanism consists of a manual control member 8 or rotary selector the first part of the rotation of which provides the intermediate opening and the continued rotation of which provides the full opening, These two degrees of opening may be achieved by distinct movements (for example a rotation followed by a translational movement of the one same manual control member 8, or the opposite).

In the examples of FIGS. 3 to 5, the manual control member 8 comprises two distinct manual control members 8, 9 actuating the collection of valve shutter(s) 6, 7 in order to provide intermediate opening and the first open position (FIGS. 3 and 4: a manual control member 8 and a manual control member 9 are capable of translational or rotational movement, FIG. 4: two manual control members 8, 9 capable of translational and/or rotational movement).

The two manual control members 8, 9 may be adjacent or concentric or situated at a distance, notably on distinct or opposite faces of the body 2.

The two degrees of opening S1, S2 of the circuit 3 may be achieved by a single valve shutter 6 having two respective open positions. However, as a preference, the two degrees of opening S1, S2 are achieved via two distinct valve shutters 6, 7 (see FIG. 4 or 6).

The two distinct valve shutters 6, 7 are preferably able to move with respect to respective seats and in the open position respectively define the two distinct bore sections S1, S2. For example, the two valve shutters 6, 7 are controlled respectively by the first manual control member 9 and the second manual control member 8.

As illustrated, the two shutoff valve shutters 6, 7 may be arranged in parallel (see FIG. 4) or in series in the one same line of the circuit 3 (see FIG. 6).

Actuation of the collection of valve shutters 6, 7 may be performed via a device that transmits force between the manual control member 8, 9 and the collection of valve shutter(s) 6, 7.

For example, the two shutoff valve shutters 6, 7 may be controlled by at least one same pushrod, and notably for example via two mobile pushrods 13, 18 in series, controlled by the first manual control member 9 and by the second manual control member 8.

For example, actuation of the first manual control member 9 (for example a first manual control member 9 pushed toward the body 2 or, respectively, pulled so that it moves away from the body 2) moves the pushrods 13, 18 over a first travel actuating the opening of a first 6 of the two valve shutters into a position in which the circuit 3 is open with the second bore section S2. Subsequent movement of the second manual control member 8 (a second manual control member 8 pulled up/away from the body 2 for example) moves the pushrods 13, 18 over a second travel actuating the opening of the second 7 valve shutter into a position in which the circuit 3 is open with the first bore section S1.

As a preference, the movement of the second manual control member 8 from its rest position toward its active position describes a movement of a different nature or in a distinct direction, notably in an opposite direction, compared with the movement of the first manual control member 9 moving from its rest position toward its actuated position. Of course, the direction of actuation or of movement of the manual control member 9 (first manual control member 9) from its locked position toward its unlocked position may be identical or similar to the direction of actuation or of movement of the manual control member 8 from its rest position toward its active position. For example, in order to lift the manual control member 8 (to move it away from the body) it is necessary beforehand to lift the manual control member 9 (move it away from the body) likewise by a determined distance, for example a few centimeters. These two movements (manual control member 8 and manual control member 9) may be parallel. The axes of rotation of the manual control member 8 and of the manual control member 9 may notably be parallel.

Likewise, the return of the manual control member 9 to its locked position and the return of the manual control member 8 to its closed position may describe movements that are identical or identical directions (for example toward the body in this example).

Of course, the manual control member 8 and the manual control member 9 may as an alternative have distinct movements (movements that are not parallel and/or that are different in nature rotation/translation etc.).

Thus, the movements of the manual control member 8 and of the manual control member 9 may be rotations in the same direction or in opposite directions.

For example, when the manual control member 9 has to be pulled in order to pass from its locked position to its unlocked position, in its first locked position the manual control member 9 may have an end for grasping that lies along or facing the front face of the body 2 of the valve 1 (for example at a distance of between zero and 4 to 5 cm, and notably of between 1 and 3 cm away). In the unlocked position, this end may be separated by 1 to 6 cm (or more from the front face of the body 2 of the valve 1), for example separated by 3 to 5 cm from the front face of the body of the valve 1. Conversely, in the case of an manual control member 9 which needs to be pushed (toward the body 2 of the valve), the locked position may be separated by 1 to 6 cm from the body of the valve, and the unlocked position may be separated from the body 2 by zero to 3 cm.

In its locked position and/or in its unlocked position, the manual control member 9 (or at least a portion for grasping thereof) may have the same separation with respect to the body 2 of the valve as the manual control member 8 (or a portion for grasping thereof) which is in its rest position.

In the closed position, the first valve shutter 6 may sealingly close the circuit 3. In the closed position, the second valve shutter 7 may non-sealingly close the circuit 3. What that means to say is that the second valve shutter 7 has a calibrated orifice defining the second bore section S2 of the circuit 3.

The second valve shutter comprises for example a ball 7 pushed toward a seat by a spring 17. For example, the ball 7 bears non-sealingly against a seat (for example a bushing) with a predetermined spacing (bore section S2).

The passage (second bore section S2) between the ball 7 and the seat (bushing) can be obtained by impairing the line of sealing between the ball and its seat by broaching, or by a stroke with a saw or another tool. The ball 7 can be not perfectly cylindrical (faceted ball, porous ball, or ball of any other shape that allows the gas to pass at a limited flow rate).

Another alternative solution is to place a calibrated orifice in parallel with this second valve shutter 7 in order to provide the limited passage of gas. Alternatively, this calibrated orifice may pass through the body of the valve shutter 7.

In the case of two manual control member 8, 9 connected to respective cams 14, 15 (see FIGS. 6 to 10), when the first manual control member 9 is actuated (for example by pushing it toward the body or respectively by puffing it away from the body), the cam 15 of this manual control member 9 moves the first valve shutter 6 via a movement transmission mechanism. The movement transmission mechanism may notably comprise one or more pushrods 13, 18 in series (or in parallel), an elastic member 12 (notably a spring to compensate for lash and/or to maintain contact in the drivetrain transmitting movement between the cam and the valve shutter 6). Any other movement transmission mechanism may be envisioned. Reference may be made for example to document FR2828922A1.

Actuation of the first manual control member 9 moves the movement transmission mechanism by a first travel which in its turn moves the first valve shutter 6 which opens the circuit 3 at the first valve shutter 6. The gas which is permitted to pass through the calibrated orifice of the second valve shutter 7 can thus escape toward the second end 5 of the circuit 3. The gas coming from the first end 4 of the circuit 3 effectively passes between the ball 7 and the bushing 19 and then between the body 2 and the valve shutter 6 and can leave the valve 1.

Advantageously, the valve 1 may comprise a locking mechanism 10 locking the second manual control member 8 in the rest position preventing a movement toward the active position in which the circuit is open to the first bore section S1. This locking mechanism 10 can be controlled (unlocked) by the first manual control member 9.

Thus, in its rest (non-actuated) position, the first manual control member 9 can guarantee locking of the second manual control member 8 in the rest position blocking the movement of the second manual control member 8. By contrast, when the first manual control member 9 is in the actuated position (intermediate opening of the circuit 3 to a second bore section S2), the first manual control member 9 could unlock the second manual control member 8 allowing it to move (towards the active position and the opening of the circuit 3 to the first bore section S1).

What that means to say is that the first manual control member 9 has to be actuated by the user beforehand if he wishes to move the other manual control member 8 in order to fully open the circuit 3.

This configuration affords a dual safety feature: 1) the need for unlocking, limiting unwanted openings, 2) the unlocking partially opens the circuit 3 thereby starting the process of progressive opening and alerting the user to the presence of gas at the outlet connector.

This makes it possible to reduce the pressure spike downstream by slowing the rate of pressurization of the downstream chamber of the gas circuit connected to the downstream end 5 of the valve 1.

Figure 11:
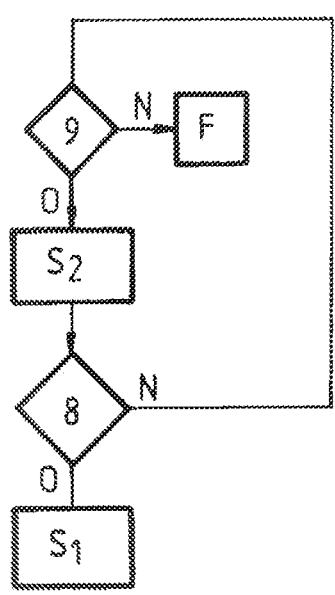
FIG. 11 is a schematic and partial view illustrating one example of the principle of operation of the invention.

FIG. 11 schematically illustrates the operation of the valve 1, If the first manual control member 9 is not activated (N) the circuit is closed (F). If it is actuated (O), the circuit 3 is open to the second bore section S2, which then allows the manual control member 8 to be actuated. In the event of release (N) the circuit automatically re-closes (F). By contrast, simultaneous and subsequent actuation of the manual control member 8 (O) allows the circuit to be fully opened (S1). Otherwise (N) the valve 1 returns to its closed or open position depending on the position of the manual control member 9.

The system of locking of the second manual control member 8 can be located at the cam 14 thereof.

For example, the profile of the cam 14 of the second manual control lever 8 may comprise a shape 20 which comes into abutment with a complementary shape belonging to the movement transmission mechanism (and notably the end of a pushrod 18).

In the raised position (first manual control member 9 in the locked position, see FIG. 6 or 7, for the case of pushing to move into an unlocked position), the movement transmission mechanism (and notably the end of a pushrod 18) forms a mechanical end stop preventing the second manual control member 8 from rotating.

In the lowered position (first manual control member 9 in the unlocked position, see FIG. 9), the movement transmission mechanism (and notably the end of a pushrod 18) is retracted and no longer forms a mechanical end stop preventing the second manual control member 8 from rotating.

At the end of this first travel, the second manual control member 8 is thus unlocked and a reduced flow rate of gas is released.

This first travel thus allows the pushrod 18 to be positioned beyond an shape 20 at the cam profile 14.

The second manual control member 8 can then be pivoted in its turn in order to move the mechanism 18, 13 a little further (second travel). This second travel allows the second valve shutter 7 (ball) to be moved off its seat (via the end of the first valve shutter 6).

In this configuration, the circuit 3 is open more extensively (fully, first bore section S1). This allows the gas a higher flow rate and a more rapid rise in pressure downstream of the valve shutters.

As a preference, the closing of the circuit 3 (from a wide-open position S1) is achieved in a single gesture.

For example, the second manual control member 8 (or the like) and the first manual control member 9 (or the like) are moved, together, into the initial (circuit closed) position via a mechanism that couples their movements.

For example, this coupling mechanism automatically urges the first manual control member 9 toward its initial position when the second manual control member 8 is moved from its active position toward its rest position.

As a preference, the two manual control members 8, 9 can be manipulated with a single hand (in the direction of full opening and/or in the direction of closing of the circuit).

Figure 10:
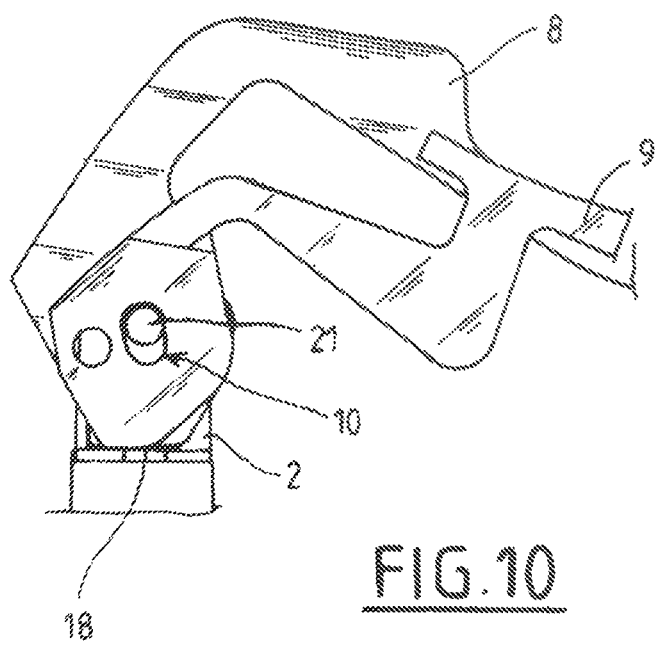
FIG. 10 depicts a view similar to that of FIG. 7, in a third configuration of use.

As illustrated in the example of FIG. 10, when the second manual control member 8 is lifted up (active position) the first manual control member 9 may (or possibly must) be likewise lifted up (for example via the coupling mechanism). Of course, as an alternative, the first manual control member 9 could remain in the lowered position (close to the body 2) or, respectively, in the raised lifted-up position when the other manual control member 8 is lifted up into the active position.

In this way, the two valve shutters 6, 7 can be controlled by the one same movement transmission mechanism and notably at least one same mobile pushrod 18, 13.

This movement transmission mechanism may effect a translational movement by two different travels, the one a short travel allowing a limited flow rate (second bore section S2), and the other a long travel allowing the full flow rate (first bore section S1).

Of course, the invention is not restricted to the example of the figures described hereinabove. The manual control member 8, 9 may be replaced by rotary handwheels or other mechanisms. For example, the cam or cams 14, 15 could be actuated by rotary handwheels.

The two travels of the movement transmission mechanism may be controlled by cams having axes of rotation of the manual control member 8, 9 that are identical (coincident) or distinct.

As a preference, the full (re-)closure of the two valve shutters 6, 7 may be brought about in a single gesture which allows the two valve shutters 6, 7 to be neutralized in the one same manual action.

For example, a mechanism for coupling the movement of the second manual control member 8 and the first manual control member 9 can be incorporated into the cams 14, 15 of the levers.

For example, a rod 21 attached to at least one manual control member 8 may be housed in at least one locking mechanism 10 formed in the other cam 15 and accommodating and guiding the rod 21.

Thus, the movement of the second manual control member 8 toward its rest position also causes the return of the other manual control member 9 toward its locked position.

Conversely, when the first manual control member 9 has been positioned in its unlocked second position, the movement of the other manual control member 8 toward its active (for example raised) position may also cause the manual control member 8 to move (to be lifted up for example).

Of course, the invention is not restricted to the examples hereinabove. For example, the locking mechanism could be incorporated into the cams 14, 15 via a system of rods 21 and grooves of the same type as that of the coupling mechanism. Likewise, this locking mechanism for the manual control member 8 could be located elsewhere on the valve 1. In addition, this locking mechanism could be of the magnetic and/or pneumatic and/or electromechanical and/or hydraulic type.

It will therefore be appreciated that, while being simple and inexpensive in structure, the invention offers numerous advantages.

The valve 1 allows the users to open a gas cylinder or a collection (rack) of gas cylinders at high pressure (for example between 150 and 300 bar or more) progressively, reducing the rate at which any equipment positioned downstream of this valve becomes pressurized.

The valve 1 also affords safety against unwanted opening. Specifically, in the event of unwanted opening (first manual control member 9 actuated), a limited flow rate is released at the outlet and the releasing of the force on this first manual control member 9 automatically re-closes the circuit 3.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A valve for pressurized fluid comprising a body housing a fluid circuit having an upstream end configured to be placed in communication with a reserve of pressurized fluid and a downstream end configured to be placed in communication with a user of fluid, the circuit comprising a collection of valve shutter(s) comprising at least one shutoff valve shutter allowing the circuit to be closed or opened, the valve comprising a mechanism for manually controlling the collection of valve shutter(s), the control mechanism being mounted with the ability to move on the body between a rest position in which the collection of valve shutter(s) is in a position in which the circuit is closed and an active position in which the control mechanism actuates the collection of valve shutter(s) into a position in which the circuit is open to a first bore section, the control mechanism comprising an intermediate open position allowing the actuation of the collection of valve shutter(s) into a predetermined intermediate position in which the circuit is open to a second bore section smaller than the first bore section, the valve comprising a return member returning the control mechanism toward the rest position and a mechanical stop providing stable retention of the control mechanism in the active position, the return member moves the collection of valve shutter(s) into the rest position in which the circuit is closed and, when the collection of valve shutter(s) is in the active position and is not being held by hand, the mechanical stop maintains this active position against the force of the return member, wherein the control mechanism comprises two distinct manual control members actuating the collection of valve shutter(s) to open the circuit to the first bore section and to the second bore section, wherein a first manual control member is configured to actuate the collection of valve shutter(s) only into the intermediate position in which the circuit is open to the second bore section, and in that the second manual control member is configured to actuate the collection of valve shutter(s) only into the position in which the circuit is open to the first bore section.

2. The valve as claimed in claim 1, further comprising a locking mechanism locking the second manual control member in the rest position preventing a movement toward the active position in which the circuit is open to the first bore section, the locking mechanism being controlled by the first manual control member.

3. A valve for pressurized fluid comprising a body housing a fluid circuit having an upstream end configured to be placed in communication with a reserve of pressurized fluid and a downstream end configured to be placed in communication with a user of fluid, the circuit comprising a collection of valve shutter(s) comprising at least one shutoff valve shutter allowing the circuit to be closed or opened, the valve comprising a mechanism for manually controlling the collection of valve shutter(s), the control mechanism being mounted with the ability to move on the body between a rest position in which the collection of valve shutter(s) is in a position in which the circuit is closed and an active position in which the control mechanism actuates the collection of valve shutter(s) into a position in which the circuit is open to a first bore section, the control mechanism comprising an intermediate open position allowing the actuation of the collection of valve shutter(s) into a predetermined intermediate position in which the circuit is open to a second bore section smaller than the first bore section, the valve comprising a return member returning the control mechanism toward the rest position and a mechanical stop providing stable retention of the control mechanism in the active position, the return member moves the collection of valve shutter(s) into the rest position in which the circuit is closed and, when the collection of valve shutter(s) is in the active position and is not being held by hand, the mechanical stop maintains this active position against the force of the return member, wherein the control mechanism comprises two distinct manual control members actuating the collection of valve shutter(s) to open the circuit to the first bore section and to the second bore section, further comprising a coupling mechanism that couples the movement of the second manual control member and of the first manual control member when the second control member is moved from the active position toward the rest position, the coupling mechanism automatically urging the first manual control member toward the non-actuated position.

4. A valve for pressurized fluid comprising a body housing a fluid circuit having an upstream end configured to be placed in communication with a reserve of pressurized fluid and a downstream end configured to be placed in communication with a user of fluid, the circuit comprising a collection of valve shutter(s) comprising at least one shutoff valve shutter allowing the circuit to be closed or opened, the valve comprising a mechanism for manually controlling the collection of valve shutter(s), the control mechanism being mounted with the ability to move on the body between a rest position in which the collection of valve shutter(s) is in a position in which the circuit is closed and an active position in which the control mechanism actuates the collection of valve shutter(s) into a position in which the circuit is open to a first bore section, the control mechanism comprising an intermediate open position allowing the actuation of the collection of valve shutter(s) into a predetermined intermediate position in which the circuit is open to a second bore section smaller than the first bore section, the valve comprising a return member returning the control mechanism toward the rest position and a mechanical stop providing stable retention of the control mechanism in the active position, the return member moves the collection of valve shutter(s) into the rest position in which the circuit is closed and, when the collection of valve shutter(s) is in the active position and is not being held by hand, the mechanical stop maintains this active position against the force of the return member, wherein the control mechanism comprises two distinct manual control members actuating the collection of valve shutter(s) to open the circuit to the first bore section and to the second bore section, wherein the collection of valve shutter(s) comprises two distinct shut-off valve shutters able to move with respect to respective seats and in the open position respectively defining the two distinct bore sections, wherein the two distinct shut-off valve shutters are arranged in series in the one same line of the circuit, wherein the two shutoff valve shutters are controlled by at least one same mobile pushrod controlled by the first manual control member and the second manual control member, wherein actuation of the first manual control member moves the pushrod over a first travel that actuates the opening of a first of the two valve shutter(s) into an open position with the second bore section for the circuit and in that the subsequent movement of the second manual control member from the rest position toward the active position moves the pushrod over a second travel actuating the opening of the second valve shutter into a position in which the circuit is open with the first bore section.

* * * * *